United States Patent
Kawabata et al.

[19]

[11] Patent Number: 6,121,951
[45] Date of Patent: Sep. 19, 2000

[54] DATA PROCESSING APPARATUS

[75] Inventors: Shuichi Kawabata, Kashiba; Mami Iida; Hideaki Chijiwa, both of Nara, all of Japan

[73] Assignee: Sharp Kabushiki Kaisha, Osaka, Japan

[21] Appl. No.: 08/834,548

[22] Filed: Apr. 4, 1997

[30] Foreign Application Priority Data

May 21, 1996 [JP] Japan .................................. 8-125964

[51] Int. Cl.[7] .................................................. G06F 15/40
[52] U.S. Cl. ........................ 345/114; 345/339; 345/150
[58] Field of Search .................................. 345/339, 347, 345/352, 114, 115, 116, 141, 150; 707/3, 7

[56] References Cited

U.S. PATENT DOCUMENTS

| | | | |
|---|---|---|---|
| 5,347,623 | 9/1994 | Takano et al. | 345/341 |
| 5,392,387 | 2/1995 | Fitzpatrick et al. | 345/350 |
| 5,398,338 | 3/1995 | Yoshida | 707/7 |
| 5,557,794 | 9/1996 | Matsunaga | 707/3 |
| 5,729,731 | 3/1998 | Yajima et al. | 707/3 |

FOREIGN PATENT DOCUMENTS

| | | |
|---|---|---|
| 0369829 | 5/1990 | European Pat. Off. . |
| 0582057 | 2/1994 | European Pat. Off. . |
| 3260770 | 11/1991 | Japan . |
| WO 8901658 | 2/1989 | WIPO . |
| WO 9208182 | 5/1992 | WIPO . |
| WO 9314458 | 7/1993 | WIPO . |

OTHER PUBLICATIONS

Jack G. Conrad et al.; "A System for Discovering Relationships by Feature Extraction from Text Databases"; *Sigir '94, Conf. 17*, Jul. 3, 1994; pp. 260–270.

"Dynamic Icon Content and Appearance Variation Mechanism—Provides User with Awareness of System Status and Dynamic Changes in Objects NoAbstract"; *Database WPI, Research Disclosure*, vol. 298, No. 024, Feb. 10, 1989.

*Primary Examiner*—Steven J. Saras
*Assistant Examiner*—Fritz Alphonse

[57] ABSTRACT

In a data processing apparatus, data stored in a storage section are retrieved according to a desired retrieval condition so as to be displayed on a display section. When the retrieved data are displayed on the display section, not only the retrieved data but also the retrieval condition are displayed. As a result, both the retrieved results and the retrieval condition can be exactly recognized on the display screen at a glance.

13 Claims, 9 Drawing Sheets

FIG. 4 (a)

| DATE SEQUENTIAL | RED | GREEN | BLUE |

| Sep. 18, 1995 RED — 2 | Sep. 13, 1995 GREEN — い |
| Sep. 6, 1995 BLUE — B | Aug. 25, 1995 RED — 1 |
| Aug. 13, 1995 GREEN — あ | Aug. 10, 1995 BLUE — A |

| DATE SEQUENTIAL | RED | GREEN | BLUE |

| Sep. 18, 1995 RED — 2 | Aug. 25, 1995 RED — 1 |
| | |
| | |

FIG. 4 (c)

| DATE SEQUENTIAL | RED | GREEN | BLUE |

| Sep. 18, 1995 RED — 2 | Aug. 25, 1995 RED — 1 |
| Sep. 6, 1995 BLUE — B | Aug. 10, 1995 BLUE — A |
| | |

FIG. 4 (d)

| DATE SEQUENTIAL | RED | GREEN | BLUE |

| Sep. 18, 1995 RED — 2 | Aug. 25, 1995 RED — 1 |
| Sep. 6, 1995 BLUE — B | Aug. 10, 1995 BLUE — A |
| | |

DATA PROCESSING APPARATUS

FIELD OF THE INVENTION

The present invention relates to a data processing apparatus, particularly, an electronic datebook, etc.

BACKGROUND OF THE INVENTION

For example, an electronic datebook has an image memo function. The image memo function includes an input for inputting an image memo, and a retrieval mode for retrieving inputted image memo data and displaying all retrieved results simultaneously. These two modes are described below.

① The input mode inputs an image memo composed of, for example, graphics, character strings, etc. In this case, a color of a whole screen on a display section, namely, a background color of the image memo is determined by selecting from red, green, blue, etc., and the image memo is inputted. When the background color is determined and is displayed on the display section, the image memo to be inputted to the display section is displayed. Then, the background color data and corresponding image memo data are stored into a memory as the need arises. Here, a color of the display screen (for example, black, grey, etc.) can be directly used as the background color, or an image memo can be colored by a desired color.

② The retrieval mode, for example, retrieves all or part of image memo data stored into a memory and displays them on the display section. In this retrieval mode, conditions of retrieval are variously set, and image memo data which agree to operator's desirable condition can be taken out. Examples of the conditions are date sequential retrieval for simultaneously displaying all image memo data stored in a memory in order of date, color sequential retrieval for simultaneously displaying all image memo data in each group classified by background colors in necessary order per group, and retrieval according to colors for simultaneously displaying all image memo data in a group for a specified background color. In the retrieval mode, a retrieval menu for specifying a condition of the retrieval and all retrieved image memo data are displayed separately on the screen. As an example of the display of the detected image memo data, the image memo data which are reduced are respectively displayed on small screens obtained by dividing the screen of the whole display section into plural screens. When a number of the retrieved image data are so large that all retrieved image memo data cannot be displayed simultaneously, they are successively displayed by a scrolling function.

A similar retrieval mode to the above is disclosed in, for example, Japanese Unexamined Patent Publication No. 3-260770/1991 (Tokukaihei 3-260770).

In the above conventional retrieval mode, since the retrieval menu and retrieved image memo data are separately displayed on a screen, the following defects are pointed out.

First, if all the displaying image memo data are image memo data in a red group on the screen where detected image memo data are displayed, a retrieval condition relating to currently displaying an image memo data group cannot be occasionally recognized exactly. The reason for this is described below. Concretely, all image memo data which were retrieved and are being displayed become the image memo data in the red group, for example, when only the image memo data in the red group exist in a memory even if a date sequential retrieval mode, which displays all image memo data in a memory simultaneously, is selected, and when retrieval according to colors, which retrieves only image memo data in red group of each color group in a display memory and displays all the image memo data in the red group, is selected. Since these two cases are hardly distinguishable as mentioned above, a retrieval condition cannot be exactly recognized from the screen on which retrieved image memo data are being displayed.

In addition, if image memo data are retrieved according to another retrieval condition with the retrieved image memo data being displayed, the currently displayed image is cleared so that the retrieval menu is displayed. Then, a desirable retrieval condition should be specified from the retrieval menu. Therefore, the conventional method is troublesome.

SUMMARY OF THE INVENTION

It is an object of the present invention to provide a data processing apparatus which is capable of, when retrieved data are displayed according to a desired retrieval condition, accurately recognizing the retrieval condition on a display screen at a glance.

It is another object of the present invention to provide a data processing apparatus which is capable of, when retrieved data are displayed, changing and specifying a retrieval condition without changing an image on the display screen.

In order to achieve the above objects, a data processing apparatus, which executes a retrieval process for retrieving data stored in a storage section according to a desired retrieval condition so as to display the retrieved data on a display section, is characterized in that when the retrieved data are displayed on the display section, the retrieved data and a retrieval condition relating to the retrieved data are displayed.

In the present invention, since not only the retrieved results according to a desired retrieval condition, but also the retrieval condition are displayed simultaneously, the retrieval condition can be exactly recognized on the display screen at a glance. Moreover, unlike the conventional method, it is not necessary to call another display image so as to confirm, thereby improving convenience of use.

In addition, in the present invention, since the retrieved results according to a desired retrieval condition, and a retrieval condition specifying section for changing the retrieval condition to another one are displayed simultaneously, when intending to change a retrieval condition, it is not necessary to call another display image so as to change and specify a retrieval condition unlike the conventional method. As a result, a retrieval condition can be changed simply and quickly on the screen where the retrieved results are displayed, thereby improving convenience of use.

Furthermore, in the present embodiment, when the retrieval condition specifying section for changing a retrieval condition is displayed, the display states (shaded-off display, etc.) differ from each other depending on as to whether or not the retrieval can be executed according to the retrieval condition shown by the specifying section. Thus, a retrieval condition, which can be specified, can be distinguished from a retrieval condition, which cannot be specified, on the display screen at a glance. As a result, it is not necessary to execute useless processes, thereby improving convenience of use.

For fuller understanding of the nature and advantages of the invention, reference should be made to the ensuing detailed description taken in conjunction with the accompanying drawings.

BRIEF DESCRIPTION OF THE DRAWINGS

FIGS. 4(a), 4(b), 4(c) and 4(d) are explanatory drawings which show examples of a display screen of the electronic datebook in FIG. 1.

DETAILED DESCRIPTION OF THE PREFERRED EMBODIMENTS

The following describes details of the present invention according to embodiment. Here, the description is given as to the case where the present invention is applied to an electronic datebook, for example.

Figure 1:
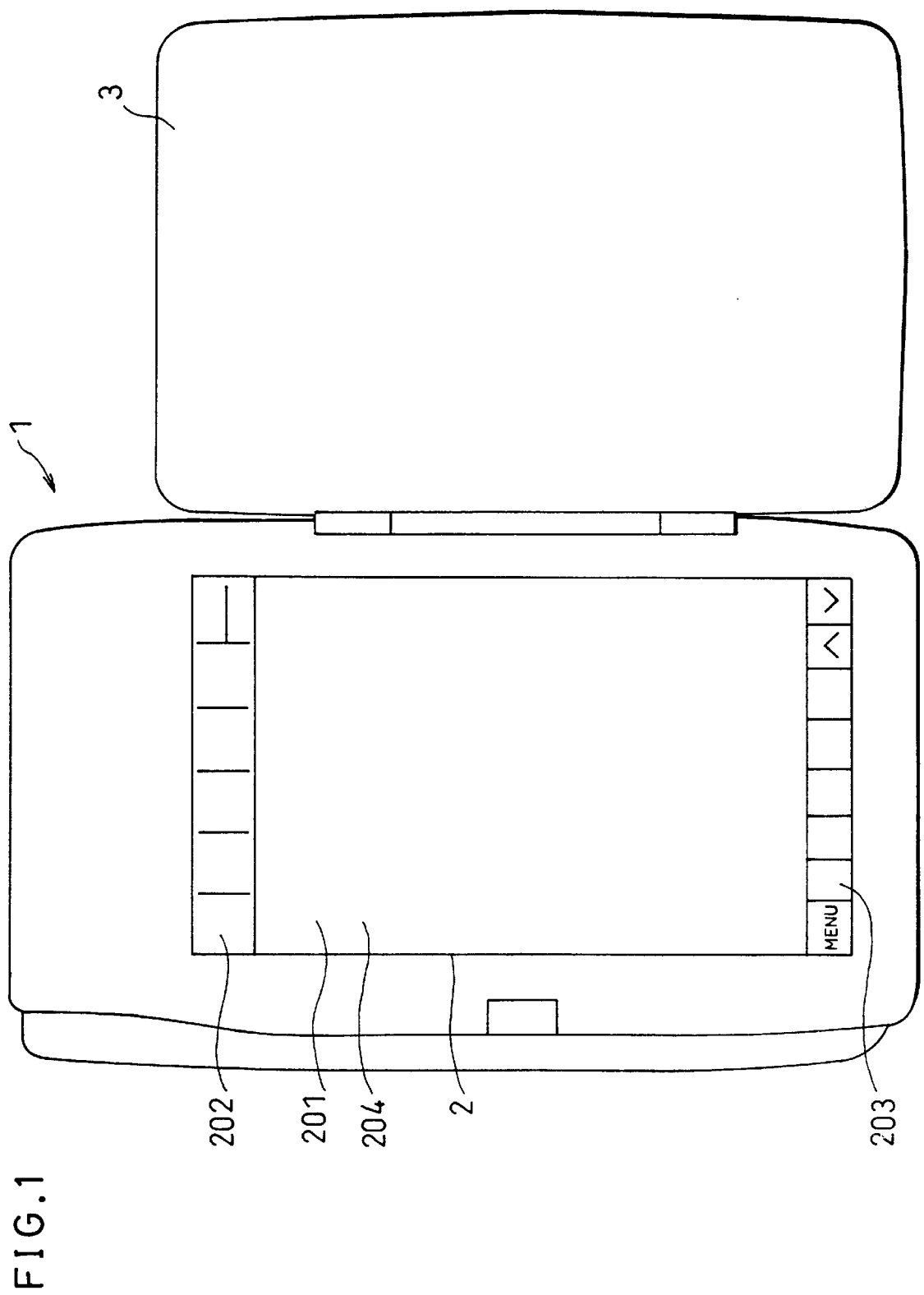
FIG. 1 is a plan view which shows appearance of an electronic datebook according to one embodiment of the present invention.
Figure 2:
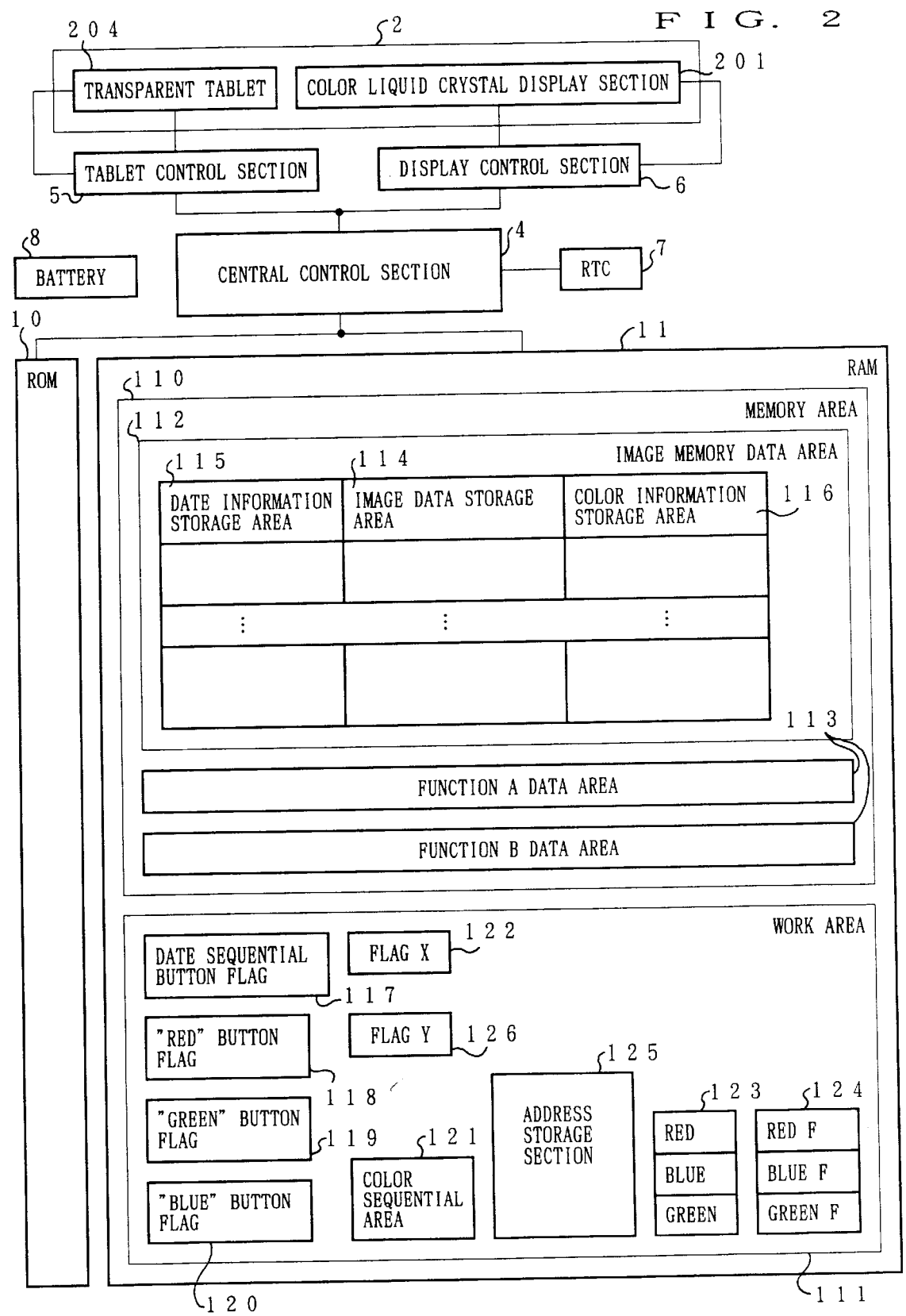
FIG. 2 is a block diagram which shows an arrangement of the electronic datebook in FIG. 1.
Figure 3:
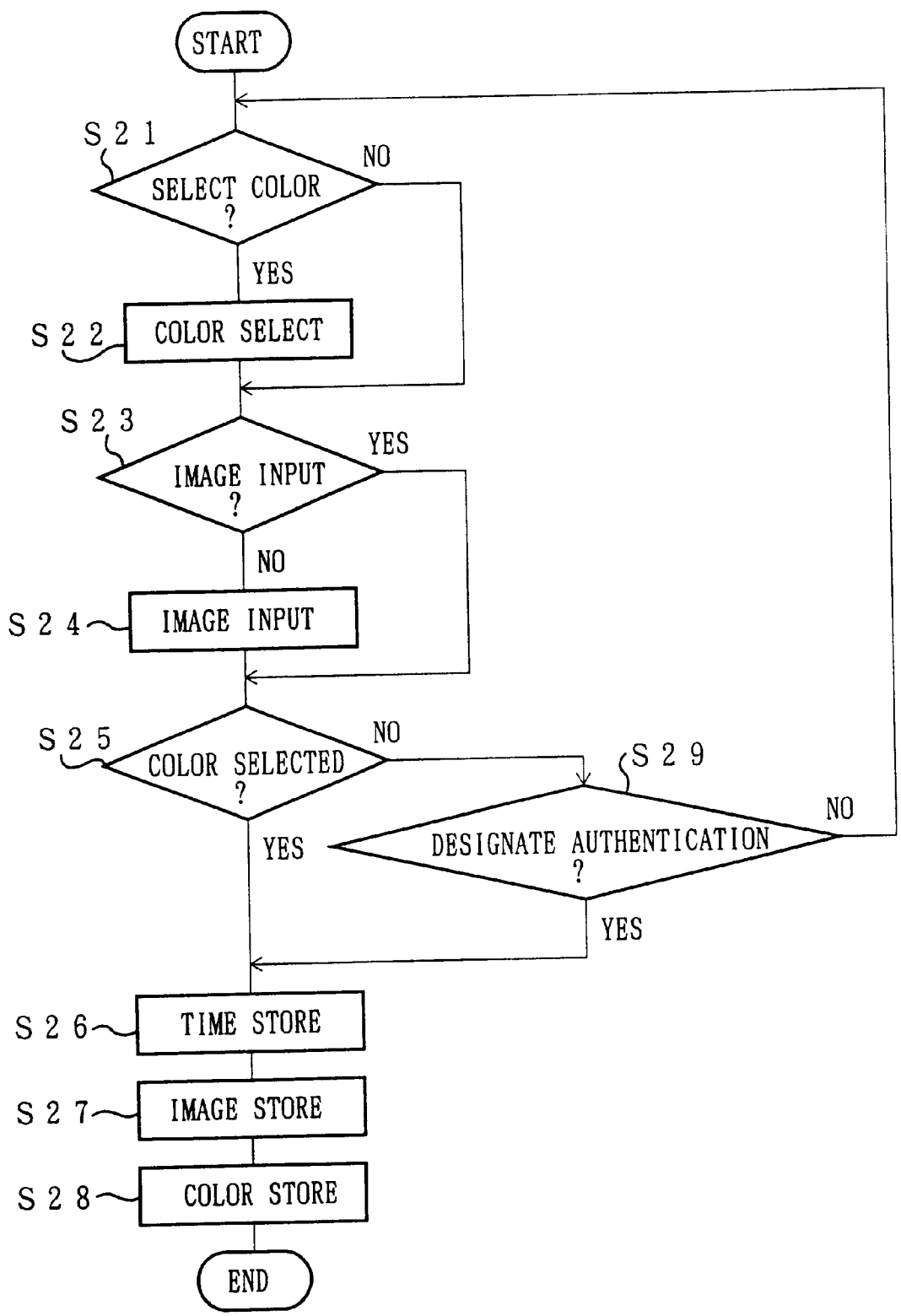
FIG. 3 is a flow chart which shows an operation of an input mode.
Figure 5:
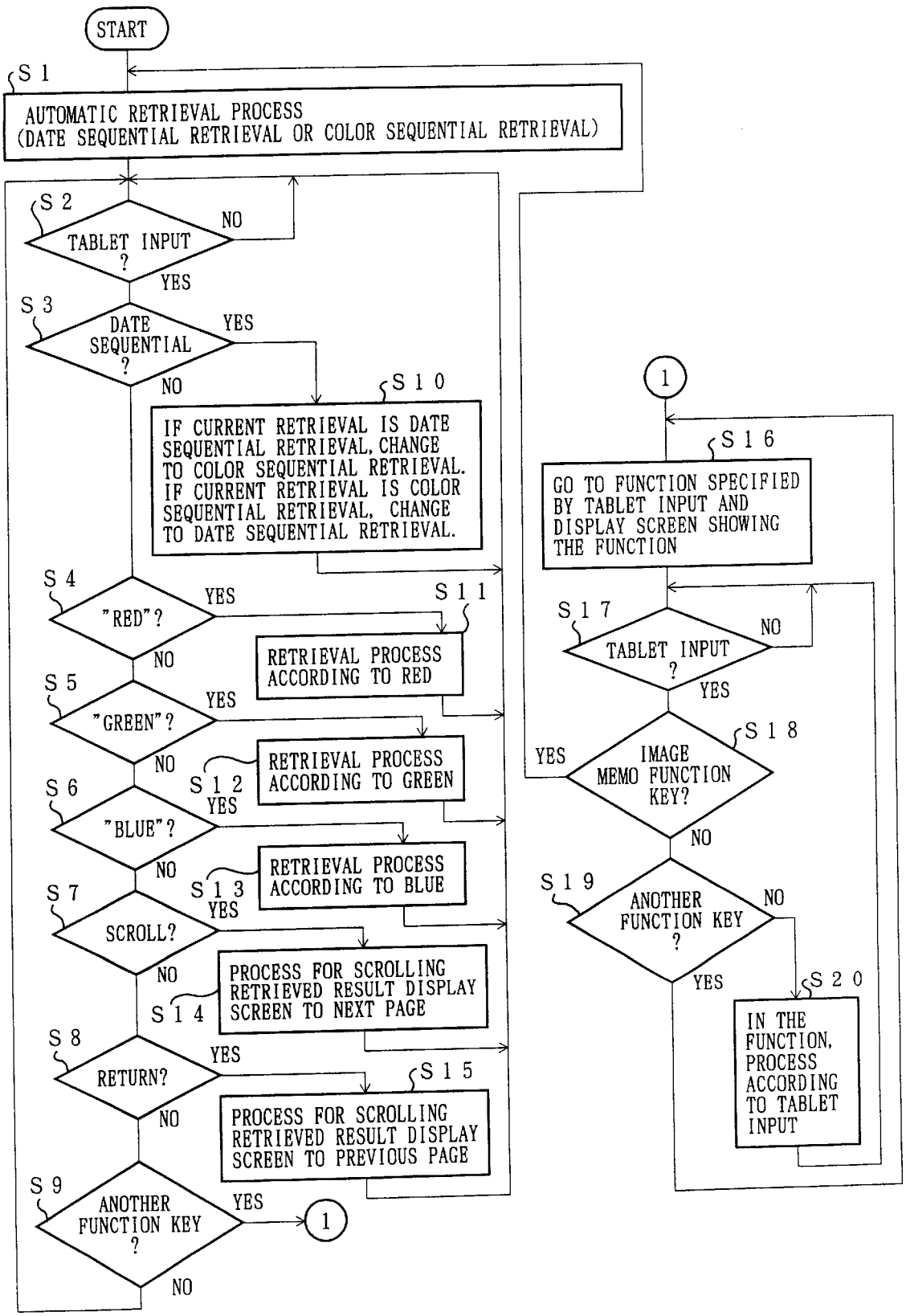
FIG. 5 is a flow chart which shows an operation of a retrieval mode.
Figure 6:
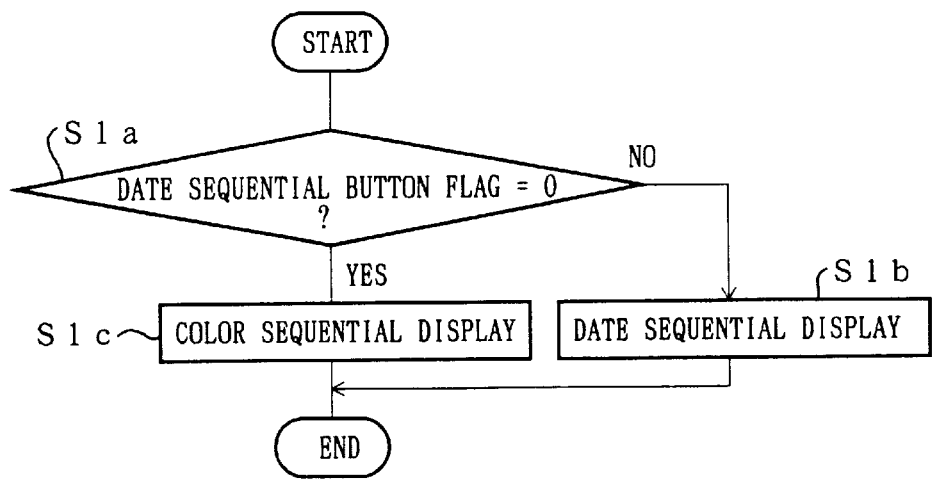
FIG. 6 is a flow chart which shows details of S1 in FIG. 5.
Figure 7:
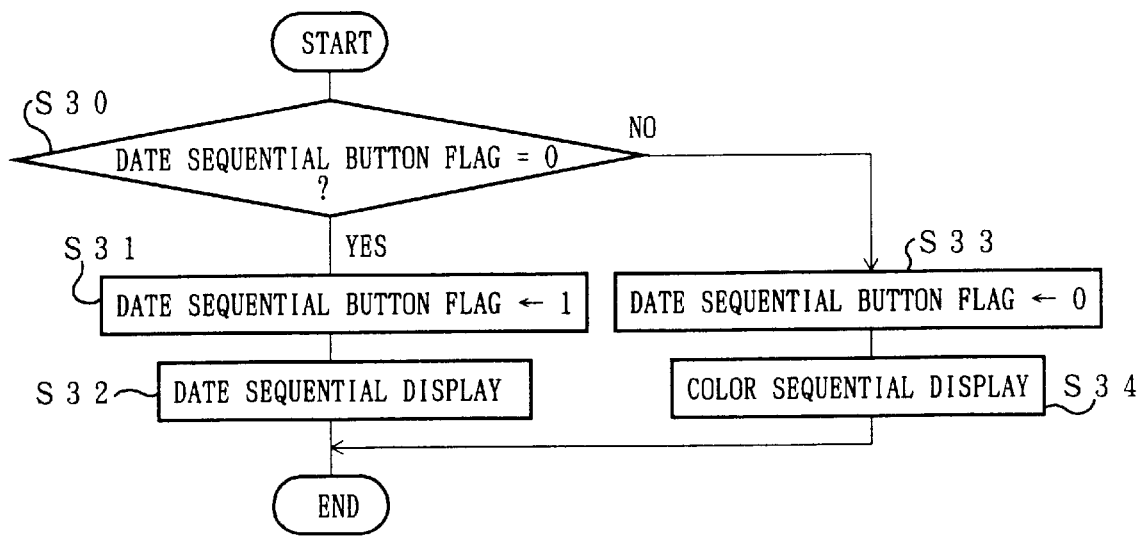
FIG. 7 is a flow chart which shows details of S10 in FIG. 5.
Figure 8:
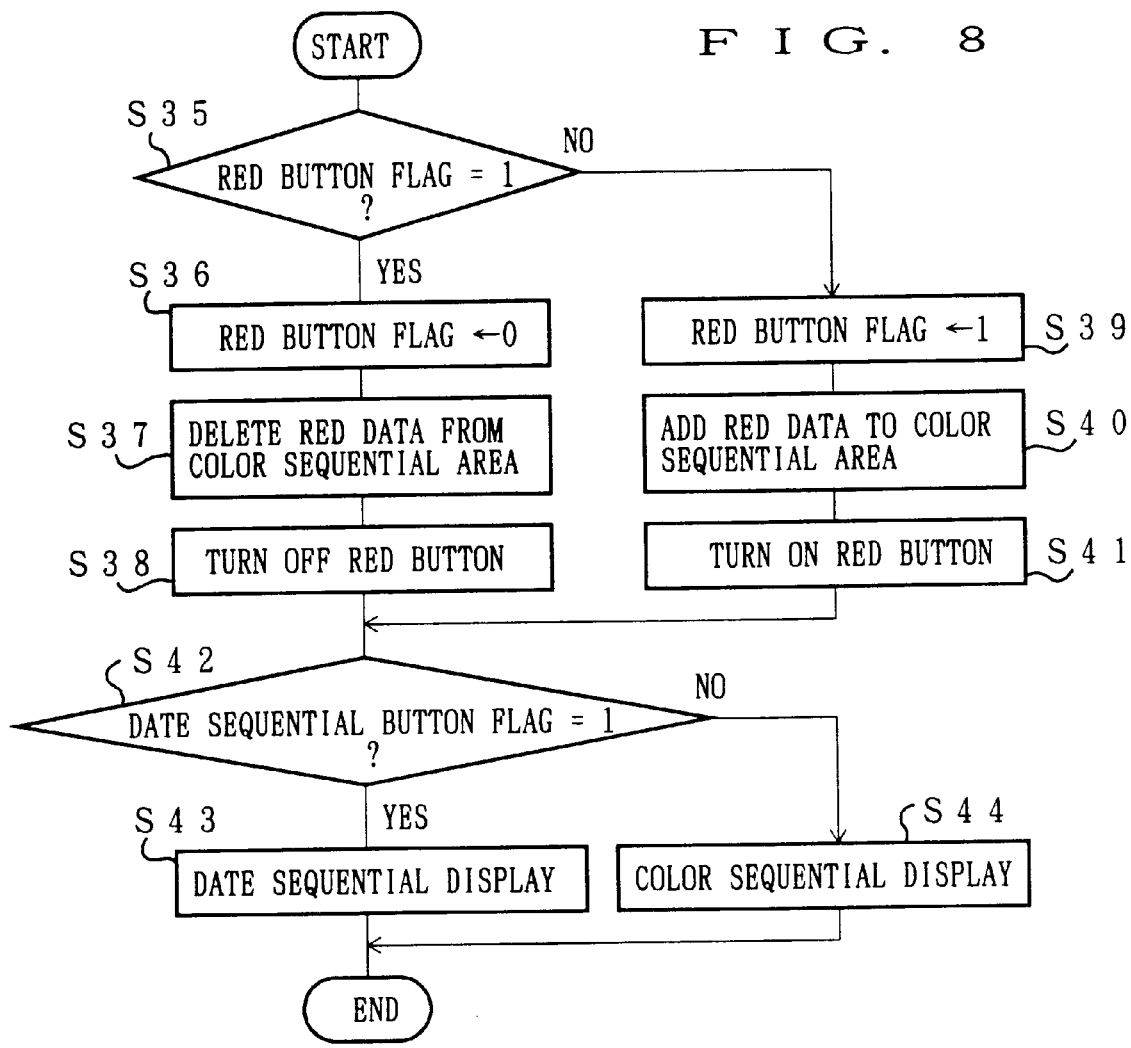
FIG. 8 is a flow chart which shows details of S11 in FIG. 5.
Figure 9:
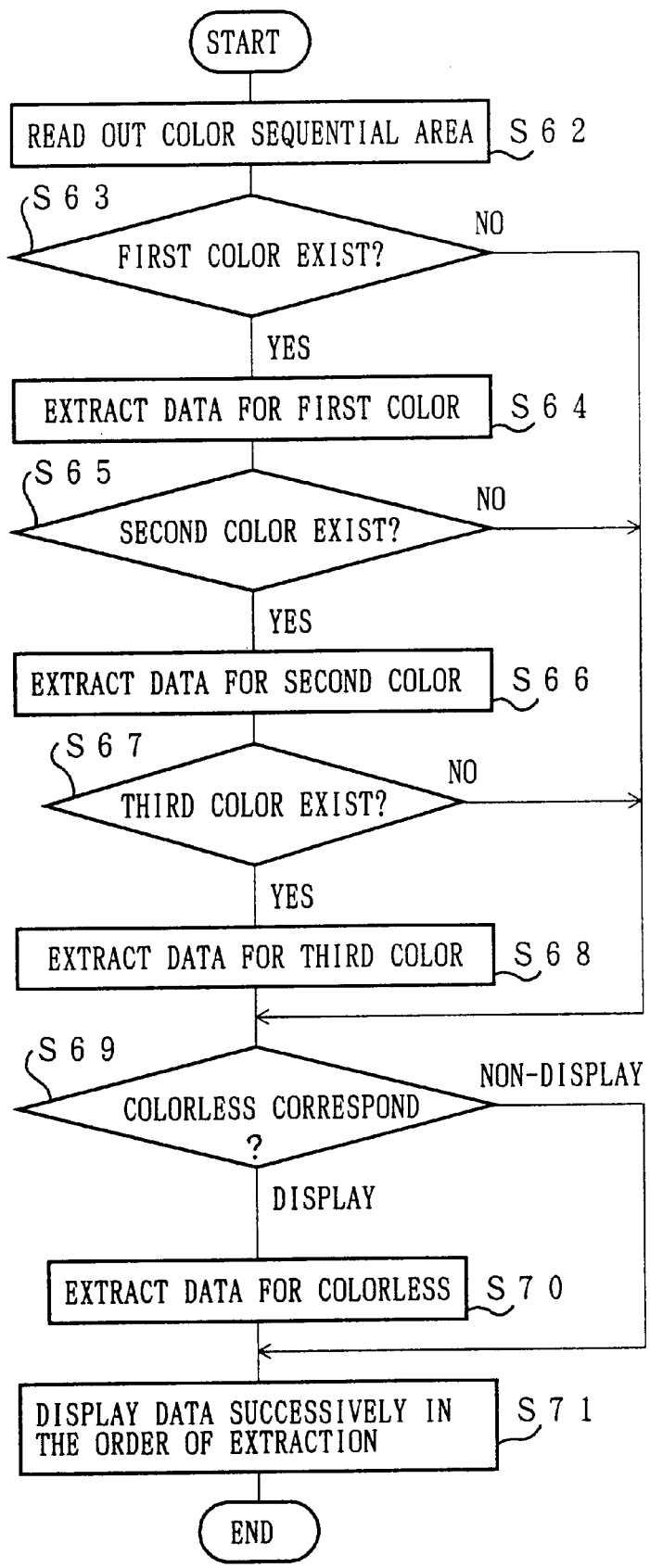
FIG. 9 is a flow chart which shows details of S34 in FIG. 7 and S44 in FIG. 8.
Figure 10:
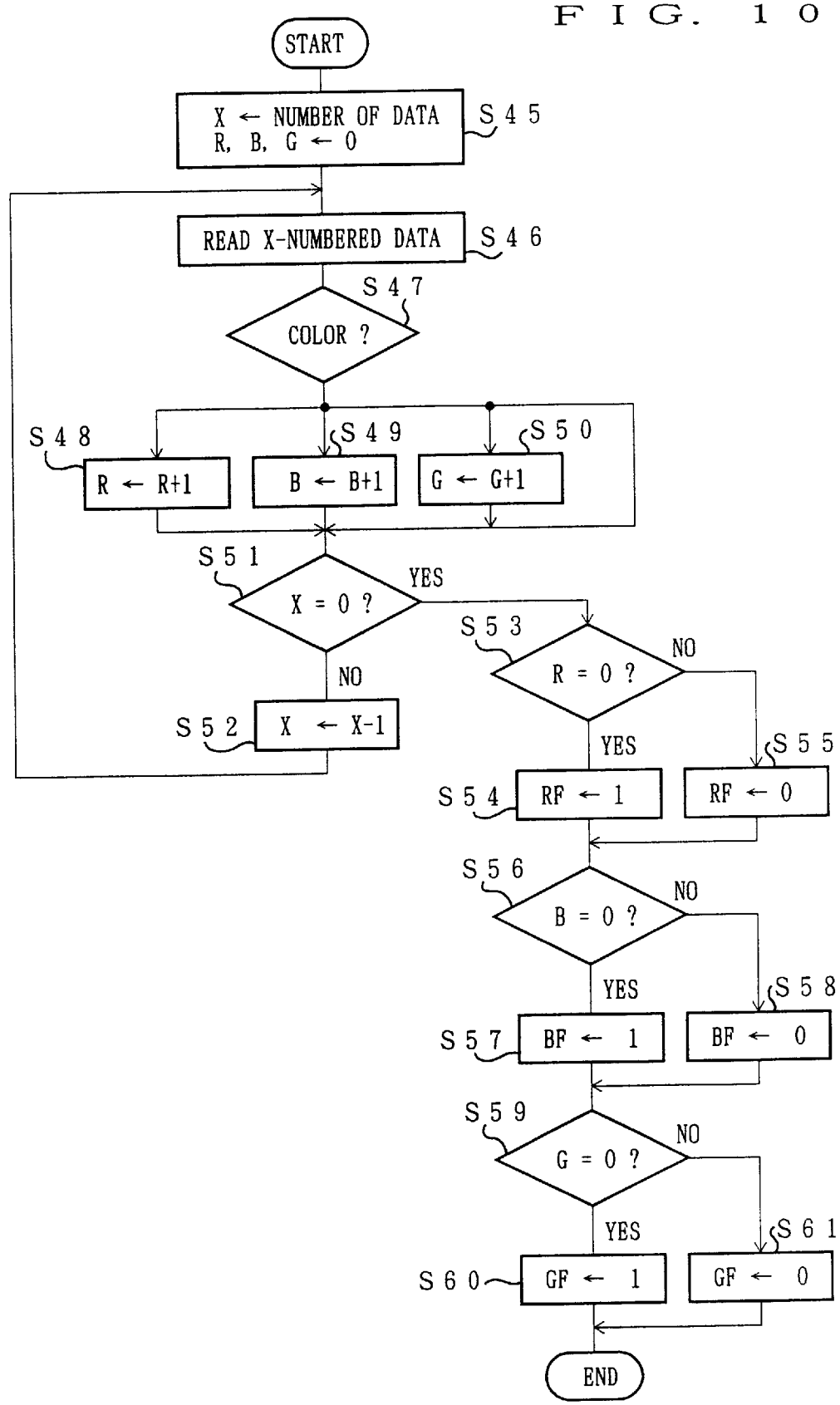
FIG. 10 is a flow chart which shows an operation of a shaded-off display processes according to the retrieval mode.

FIG. 1 is a plan view which shows appearance of an electronic datebook, FIG. 2 is a block diagram which shows an arrangement of an electronic datebook, FIG. 3 is a flow chart which explains an operation of an input mode, FIGS. 4(a) and 4(b), 4(c) and 4(d) are explanatory drawings which show examples of a display screen of the electronic datebook, FIG. 5 is a flow chart which explains an operation of a retrieval mode, FIG. 6 is a flow chart which shows details of Si in FIG. 5, FIG. 7 is a flow chart which shows details of S10 in FIG. 5, FIG. 8 is a flow chart which shows details of S11 in FIG. 5, FIG. 9 is a flow chart which shows details of S34 in FIG. 7 and S44 in FIG. 8, and FIG. 10 is a flow chart which explains an operation of a shaded-off display process according to a retrieval mode.

As shown in FIG. 1, an I/O section 2 is provided to an upper surface of an electronic datebook 1, and the I/O section 2 is exposed or protected by a front cover 3 which is connected to one side of the electronic datebook 1 via a hinge so as to freely cover the I/O section 2.

The I/O section 2 includes a color liquid crystal display section 201, a function selecting key 202, an operation selecting key 203, a transparent tablet 204, and various keys (not shown) for inputting text data such as characters and numerical information.

The color liquid crystal display section 201 adopts a matrix method and is capable of displaying characters, and may be provided with a thin board-like back light, as the need arises. The color liquid crystal display section 201 corresponds to a display section.

The operation selecting key 202 is a group of keys which are operated when various functions (calendar, schedule, address book, memo, calculation, clock, dictionary) are executed.

The operation selecting key 203 is a group of keys which are operated commonly at the time of menu display and cursor control function in the above functions.

The transparent tablet 204 is located so as to cover all the color liquid crystal display section 201, the function selecting key 202 and the operation selecting key 203. The functions and operations are selected, and characters and image data are inputted by touching the transparent table 204 with a pen, not shown. In the case where images which are displayed on the color liquid crystal display section 201 under the transparent table 204 are suitable buttons, the transparent tablet 204 functions as the buttons.

In addition, as shown in FIG. 2, the electronic datebook 1 includes a central control section 4, a tablet control section 5, a display control section (display managing means) 6, a real time clock (RTC) 7, a battery 8 for power source, a read only memory (ROM) 10 and a random access memory (RAM) 11.

The central control section 4 controls operational processes such as input and output according to various commands.

The tablet control section 5 detects a coordinate of a position of the transparent tablet 204 which was touched by the pen, not shown.

The display control section 6 displays data on the color liquid crystal display section 201 based upon a control signal from the central control section 4.

The RTC 7 outputs a current time based upon a clock, not shown.

The battery 8 supplies necessary power to components via a power source circuit, not shown.

The ROM 10 stores control programs which operate the central control section 4 according to various functions (image memo function, etc.), screen data which composes various screen display image, and fonts for displaying character information.

The RAM 11 has a memory area 110 which stores various data such as inputted character information, numerical information and image information, and a work area 111 which stores data temporarily for operating processes.

The memory area 110 includes an image memo data area 112 which stores image memo data, and function data areas 113 which store data for various functions. An arrangement of function data areas 113 is not particularly shown in the drawing in the present invention. The image memo data area 112 is composed of an image data storage area 114 which stores inputted image data, a date information storage area 115 which stores an input date, and a color information storage area 116 which stores color information of inputted data.

The work area 111 includes a date sequential button flag 117 which indicates whether all data are displayed simultaneously according to a date sequence, red, green and blue button flags 118, 119 and 120 which indicate whether all data are displayed simultaneously according to colors such as red, green and blue, and a color sequential area 121 which stores the order of priority of data output at the time of simultaneously displaying all data.

The following explains the image memo function of the various functions of the electronic datebook 1 having the above arrangement, which corresponds to a feature of the present invention. The image memo function includes an input mode for inputting an image memo, and a retrieval mode (retrieval process) for retrieving inputted image memo data and displays all data simultaneously. Each mode is described below.

First, the following describes the input mode on reference to the flow chart in FIG. 3. An operator inputs data by using a suitable input device. For example, image data are inputted by using a pen, not shown. In addition, besides image data, text data such as a schedule and telephone directory can be inputted, so the type of data does not a matter.

When an operator specifies the input mode using the function selecting key 202, a judgment is made at S21 as to whether a background color of an image on the display section is to be colored or not. If the background is to be colored, a color specified by the operator is defined at S22 and the sequence goes to S23. But if the background is not to be colored, S22 is skipped and the sequence goes to S23. At S23, a judgment is made as to whether image data are already inputted or not. If image data are not inputted, the image data are inputted at S24 and the sequence goes to S25. If image data are inputted, S24 is skipped and the sequence goes to S25.

At S25, a judgment is made as to whether the background is colored or not. When the judgment is made that the background is colored, the RTC 7 fetches a current time at S26 and the date information storage area 115 stores this time as a time when the input data are stored. Then, after the image data and the color information are stored respectively into the image data storage area 114 and the color information storage area 116 corresponding to the date information storage area 115 at S27 and S28, the operation is ended. Meanwhile, when the judgement is made at S25 that the background is not colored, a confirmation is made at S29 as to whether the background is to be colored or not. This confirmation is judged based upon the input by the operator. Here, when the judgement is made that the background is to be colored, the sequence returns to S21, but when the judgement is made that the background is not to be colored, S26 through 28 are executed, and the operation is ended.

As mentioned above, the operator can successively input a plurality of data and the data can be stored in order of the input. In the aforementioned input mode, either of the color information for the background and the image data can be inputted first. Moreover, when the background is not colored, information about no coloring (background is a color of the display screen, i.e., black or grey) are stored as background color information together with the image data.

The following describes the retrieval mode on reference to the flow charts in FIGS. 5 through 10, and examples of displayed images in FIGS. 4(a), 4(b), 4(c) and 4(d).

An outline of the operation according to the retrieval mode is described. When an operator specifies the retrieval mode using the function selecting key 202, an automatic retrieval process is performed immediately (S1). Namely, data are retrieved according to one of retrieval conditions, the date sequence and color sequence regardless of the operator's volition, and all retrieved results are displayed simultaneously, and a date sequential button 201B, and red, green and blue buttons 201C through 201E are displayed. At this time, if the retrieval condition is the data sequence, the date sequential button 201B is inverted, and all the red, green and blue buttons 201C through 201E are displayed normally. However, in the case of the color sequence, the date sequential button 201B is normally displayed, and all the red, green and blue buttons 201C through 201E are inverted and displayed. The normal display and the inverted display are executed so that the operator can recognize a current retrieval condition. The date sequential button 201B, and the red, green and blue buttons 201C through 201E function both as display of a retrieval condition and display of each retrieval condition specifying section in claims.

When the operator is not satisfied with the simultaneously display according to the automatic retrieval, the operator can change and specify a desirable retrieval condition on the display screen on which the simultaneous display is executed, and can call another function instead of the image memo function (S2 through S20). There exist three examples of the retrieval conditions which can be specified here: ① date sequential retrieval (simultaneously display all stored input data in order of date); ② color sequential retrieval (simultaneously display input data in each color group which are classified by a background color); and ③ retrieval according to colors (display input data in a group for a specified background color in order of date).

Display examples of the retrieved results according to various retrieval conditions are shown in FIGS. 4(a), 4(b), 4(c) and 4(d).

In FIG. 4(a), all retrieved results in the case where the date sequential button flag 117 shows "1" and the red, green and blue button flags 118 through 120 to "0", namely, the case where the retrieval condition is the date sequential retrieval, are displayed simultaneously on the screen of the color liquid crystal display section 201. In this case, all data, which are composed of date information in the date information storage area 115 and image information in the image data storage area 114 and background color information in the color information storage area 116, are simultaneously displayed beginning from an image whose date information which is stored in the date information storage area 115 is the latest and in the order of newness. At the same time, the date sequential button 201B is inverted and the red, green and blue buttons 201C through 201E are normally displayed among the red, green, and blue buttons 201C through 201E.

In FIG. 4(b), all retrieved results in the case of the condition of the retrieval according to color (only red) are displayed simultaneously. In this case, only the image data relating to red in the color information storage area 116 are displayed on the image data display area 201A of the color liquid crystal display section 201. At the same time, the date sequential button 201B is normally displayed and only the red button 201C is inverted and displayed.

In FIG. 4(c), all the retrieved results in the case where the retrieval condition is the retrieval according to colors (red and blue) are displayed simultaneously. In this case, both the image data relating to red and the image data relating to blue in the color information storage area 116 are displayed simultaneously on the image data display area 201A according to the order of priority stored in the color sequential area 121 (① red, ② blue). At the same time, the date sequential button 201B is normally displayed, and the red button 201C and the blue button 201E are inverted and displayed among the red, green, and blue buttons 201C through 201E.

In FIG. 4(d), all the retrieved results in the case where the retrieval condition is the color sequential retrieval are displayed simultaneously. Here in this embodiment, it is assumed that green image data do not exist. In this case, both the image data relating to red and the image data relating to blue in the color information storage area 116 are displayed at once on the image data display area 201A according to the order of priority (① red, ② blue) stored in the color sequential area 121. At the same time, the date sequential button 201B is normally displayed, and the red button 201C and the blue button 201E are inverted and displayed among the red, green, and blue buttons 201C through 201E. In particular here, an example is given in the state that no image memo data relating to green exist in the color information storage area 116. For this reason, in order to show that the retrieval relating to green cannot be specified in a current state, the green button 201D is shaded off. The details of the shaded-off display will be explained later on reference to FIG. 10.

The following describes the details of the retrieval mode, namely, S1 thorough S20.

At S1 the image data stored in the image data storage area 114 of the image memo data area 112 in the RAM 11 are retrieved according to the retrieval condition, i.e., the states of the date sequential button flag 117 of the work area 111 or the red, green and blue buttons 201C through 201E, or the color sequential area 121, and all the retrieved image data are displayed simultaneously according to the date sequence or color sequence (automatic retrieval process). The date sequential button flag 117 shows "1" as an initial value, namely, a flag set state, but the last state is retained during operation. The display in this state is shown in FIG. 4(*a*). As shown in FIG. 6, a judgment is made at S1, as to whether or not the date sequential button flag 117 shows "0" (S1*a*). If the date sequential button flag 117 shows "1", all data are displayed simultaneously in order of date according to the date information stored in the date information storage area 115 (S1*b*), and the sequence goes to S2. Meanwhile, if the date sequential button flag 117 shows "0", all data are displayed simultaneously in order of color according to the content set in the color sequential area 121 (S1*c*), and the sequence goes to S2.

The following describes S2 through S20 following the automatic retrieval process at S1. At S2, the sequence is in a state of waiting for input through the transparent table 204 by the operator. Namely, when the date sequential button 201B, the red, green and blue buttons 201C through 201E or another function key (not shown), which are displayed on the color liquid crystal display section 201 together with the retrieved results, is operated in the state that all the retrieved results are displayed simultaneously at S1, a judgment is made what the input is according to S3 through S9, and the corresponding processes S10 through S20 are performed according to the judgment.

When the input is detected at S2, a judgment is made at S3 as to whether the date sequential button is specified or not. Namely, the judgment is made as to whether or not the input through the transparent tablet 204 is a coordinate of a display position of the date sequential button 201B. Here, if not, the sequence goes to S4, but if it is the date sequential retrieval, the sequence goes to S10. At S10 if the current retrieval condition is the date sequential retrieval, the retrieval condition is changed to the color sequential retrieval according to the display of the current retrieved results. Moreover, if the current retrieval condition is the color sequential retrieval, it is changed to the date sequential retrieval. Namely, as shown in FIG. 7, a judgment is made as to whether or not the date sequential button flag 117 shows "0" (S30). Here, if the date sequential button flag 117 shows "0", the setting is changed to "1" (S31) and the date sequential button 201B is inverted and displayed. Moreover, the data are displayed simultaneously according to the date information stored in the date information storage area 115 (S32), and the sequence returns to S2. Meanwhile, if the date sequential button flag 117 shows "1", the setting is changed to "0" (S33), and the inverted display of the date sequential button 201B is released. Then, the data are displayed simultaneously according to the contents set in the color information area 121 (S34), and the sequence returns to S2.

A judgment is made at S4 as to whether or not the button relating to red is specified. The judgment is made as to whether the input through the transparent tablet 204 is a coordinate of the display position of the red button 201C. Here, if the input is not the red button, the sequence goes to S5, but if the input is the red button, the sequence goes to S11. The process at S11 is shown in FIG. 8. A judgment is made as to whether or not the red button flag 118 shows "1". Here, if the red button flag 118 shows "1", the setting is changed to "0" (S36), and the red data "01" is deleted from the color sequential area 121 and another data are put into the area where the red data "01" have been removed (S37) Then, the inverted display of the red button 201C is released, and the operator is informed that the image data relating to red is removed from objects of retrieval (S38). Meanwhile, if the red button flag 118 shows "0", the setting is changed to "1" (S39), and the red data "01" are added to the last of the color sequential area 121 (S40). Then, the red button 201C is inverted and displayed, and the operator is informed that the image data relating to red become the objects of retrieval (S41). Thereafter, a judgment is made as to whether or not the date sequential button flag 117 shows "1" (S42). If the date sequential button flag 117 shows "1", data are displayed simultaneously according to the date information in the date information storage area 115 (S43), and the sequence returns to S2. Meanwhile, if the date sequential button flag 117 shows "0", data are displayed simultaneously according to the contents set in the color sequential area 121 (S44), and the sequence returns to S2. For example, the display can be changed from the state in FIG. 4(*a*) to the state in FIG. 4(*b*). In this case, in the state in FIG. 4(*a*), the operator operates the date sequential button 201B so as to release the inverted display and then operates the red button 201C so as to invert the display, or sets the color button so as to release the date sequential display.

A judgment is made at S5 as to whether or not the button relating to green is specified. The judgment is made as to whether or not input through the transparent tablet 204 is a coordinate of a display position of the green button 201D. If the input is not the green button, the sequence goes to S6, but if the input is the green button, the sequence goes to S12. The process at S12 is the same as the process in FIG. 8. Namely, if the green button flag 119 shows "1", the setting is changed to "0" and the inversion of the "green" button is released. Then, the green data "02" are deleted from the color sequential area 121, and another data are put into the area where the green data "02" have been removed. On the contrary, if the green button flag 119 shows "0", the setting is changed to "1", and the green button is inverted. Then, the green data "02" are added to the last of the color sequential area 121. Thereafter, if the date sequential button flag 117 shows "0", data are displayed simultaneously according to the content set in the color sequential area 121, and the sequence returns to S2. If the date sequential button flag 117 shows "1", the contents set in the color sequential area 121 are ignored, and data are displayed simultaneously according to the date information in the date information storage area 115 so that the sequence returns to S2.

A judgment is made at S6 as to whether or not a button relating to blue is specified. The judgment is made as to whether or not input through the transparent tablet 204 is a coordinate of a display position of the blue button 201E. If the input is not the blue button, the sequence goes to S7, but if the input is the blue button, the sequence goes to S13. The process at S13 is the same as the process in FIG. 8. Namely, if the blue button flag 120 shows "1", the setting is changed to "0" and the inversion of the blue button is released. Then, the blue data "03" are removed from the color sequential area 121, and another data are put into the area where the blue data "03" have been removed. On the contrary, if the blue button flag 120 shows "0", the setting is changed to "1", the blue button is inverted so that the blue data "03" are added to the last of the color sequential area 121. Thereafter, if the date sequential button flag 117 shows "0", data are displayed simultaneously according to the contents set in the color sequential area 121, and the sequence returns to S2. If the date sequential button flag 117 shows "1", the contents set in the color sequential area 121 are ignored, and data are displayed according to the date information in the date information storage area 115. Then, the sequence returns to S2. For example, the display can be changed from the state in FIG. 4(*b*) to the state in FIG. 4(*c*). In this case, in the state in FIG. 4(*b*), the operator may operates the blue button 201E so that the button 201E is inverted and displayed.

A judgment is made at S7 as to whether or not scrolling of the display of the retrieved results to a next page is specified. The judgment is made as to whether input through the transparent tablet 204 is a coordinate of a display position of a next page scrolling button 201F. If the input is not the next page scrolling button 201F, the sequence goes to S8, but if the input is the next page scrolling button 201F, the sequence goes to S14. The state of the date sequential button flag 117 is judged at S14. If the date sequential button flag 117 shows "0", data on a next page are displayed according to the contents set in the color sequential area 121, and the sequence returns to S2, whereas if the date sequential button flag 117 shows "1", the contents set in the color sequential area 121 are ignored, data on a next page are displayed in order of date according to the date information stored in the date information storage area 115, and the sequence returns to S2.

A judgment is made at S8 as to whether or not the scrolling of the display of the retrieved results to a previous page is specified. The judgment is made as to whether or not input through the transparent table 204 is a coordinate of a display position of a previous page scrolling button 201G. If the display is not the previous page scrolling button 201G, the sequence goes to S9, but if the display is the previous page scrolling button 201G, the sequence goes to S15. The state of the date sequential button flag 117 is first judged at S15. If the date sequential button flag 117 shows "0", data on a previous page are displayed according to the contents set in the color sequential area 121, and the sequence returns to S2, whereas the date sequential button flag 117 shows "1", the contents set in the color sequential area 121 are ignored, and the data are displayed on a previous page in order of date according to the date information stored in the date information storage area 115. Then, the sequence returns to S2.

A judgment is made at S9 as to whether or not another function is specified. The judgment is made as to whether or not input through the transparent tablet 204 is a coordinate of a display position of the function selecting key 202. If another function is not selected, the sequence returns to S2, but another function is selected, the sequence goes to S16. The specified function is fulfilled at S16, and the sequence goes to S17 through S20. A judgment is made at S17 as to whether or not input through the transparent tablet 204 is executed. If the input through the table is detected, the sequence goes to S18. Meanwhile, if the input through the tablet is not detected, S17 is again executed. A judgment is made at S18 as to whether or not the input through transparent tablet 204 is selected by touching the image memo function key (not shown) located to the function selecting key 202. If the image memo function is selected, the sequence goes to S1 so that the image memo function is carried out. Meanwhile, if the image memo function key (not shown) is not selected at S18, the sequence goes to S19. A judgment is made at S19 as to whether or not the input through the transparent tablet 204 is selected by touching functions provided to the function selecting key 202 other than an on-fulfilling function. If the function is not selected, the sequence goes to S20 so that a process according to an inputted position coordinate is executed in the on-fulfilling function, and the sequence returns to S17. Meanwhile, the function is selected, the sequence returns to S16.

Details of the color sequential retrieval at S34 in FIG. 7 and at S44 in FIG. 8 are shown in FIG. 9. First, information in the color sequential area 121 is read (S62), and a judgment is made as to whether or not image data relating to a color of the first priority are stored in the color sequential area 121 (S63). If nothing is stored, the sequence goes to S69 through S71 so that image data of non-coloring are displayed. However, if color information is stored, the sequence goes to S64 through S68. The image data relating to the color of the first priority in the color sequential area 121 are extracted at S64, and their positional information is successively stored into an address storage section 125, and the sequence goes to S65. A judgment is made at S65 as to whether or not a color of the second priority is stored into the color sequential area 121. If nothing is stored, the sequence goes to S69 through S71. However, if color information is stored, image data relating to the color of the second priority in the color sequential area 121 are extracted, and their positional information is successively stored into the address storage section 125, and the sequence goes to S67. A judgment is made at S67 as to whether or not image data relating to a color of the third priority are stored into the color sequential area 121. If nothing is stored, the sequence goes to S69 through S71. However, if color information is stored, image data relating to the color of the third priority in the color sequential area 121 are extracted at S68, and their positional information is stored into the address storage section 125, and the sequence goes to S69 through S71. A judgment is made at S69 as to whether or not image data of non-coloring are displayed. This step is carried out by an operator using the operation selecting key 203. Namely, since a flag Y126 is set to "1" or "0" by the operation selecting key 203, if the flag Y126 is set to "1", the sequence goes to S70, and if set to "0", the sequence skips S70 and goes to S71. At S70 the image data of non-coloring are extracted, and their positional information is successively stored into the address storage section 125. At S71 the image data corresponding to the position information stored into the address storage section 125 at S64, S66, S68 or S70 are displayed, and the operation is ended.

In addition, the shaded-off display according to the above retrieval mode is explained on reference to FIG. 10. At S45, a number of data, which was stored in the image memo data storage area 114, is substituted into variable X, and "0" is substituted into variables R, B and G respectively representing a number of red, blue and green data so as to be initialized. X-numbered data are read at S46. At S47, according to the color of the read data read, the sequence goes to S48 if red, to S49 if blue, to S50 if green, or to S51 if otherwise or data whose color was not selected. "1" is added to R at S48, "1" is added to B at S49, and "1" is added to G at S50, and thus the respective numbers of the data are added up. A judgment is made by the variable X at S51 as to whether or not all the data are read out, and when the variable X obtains values other than "0", namely, when data still remain, 1 is subtracted from the variable X at S52, and the sequence returns to S46.

A judgment is made at S53 as to whether or not R is 0, namely, data in which red is selected exist, and if the judgement is made that the data do not exist, "1" is substituted into a variable RF so that shaded-off display is specified at S54. Moreover, if the judgement is made that the data exist, "0" is substituted into RF so that the shaded-off display is prohibited at S55. A judgment is made at S56 as to whether or not B is 0, namely, data in which blue is selected exist, and if the data do not exist, "1" is substituted into BF so that shaded-off display is specified at S57. If the data exist, "0" is substituted into BF so that the shaded-off display is prohibited at S58. A judgment is made at S59 as to whether or not G is 0, namely, the data in which green is selected exist, and if the data do not exist, "1" is substituted into GF so that shaded-off display is specified at S60. Moreover, if the data exist, "0" is substituted into GF so that the shaded-off display is prohibited at S61.

When "1" is substituted into RF, BF and GF at the time of displaying the buttons, the buttons are shaded off, and when "0" is substituted into RF, BF and GF, the buttons are not shaded off. When "1" representing the shaded-off display is substituted into RF, BF and GF, data do not exist. For this reason, the shaded-off display is executed so as to show that the buttons cannot be selected. For example, the display screen can be brought into the state in FIG. 4(d). This example is displayed when the color sequential retrieval is carried out with image data relating to green existing. When the green button 201D is shaded off in such a manner, the operator can recognize that image data relating to green cannot be retrieved. Moreover, this retrieval is not accepted.

As explained above, in the retrieval mode, not only all the retrieved results but also the date sequential button 201B, and the red, green and blue buttons 201C through 201E are simultaneously displayed on the color liquid crystal display section 201, and a retrieval condition, which derives the retrieval results, are shown by inverting and displaying the buttons 201B through 202E. As a result, the operator can recognize a retrieval condition at a glance exactly on the screen where the retried results are displayed simultaneously, thereby improving convenience of use.

In particular, when the retrieval mode is executed, retrieval is executed based upon either of the retrieval conditions, the date sequential retrieval or color sequential retrieval regardless of operator's will, and all retrieved results are displayed simultaneously. For this reason, it is not necessary to particularly specify a retrieval condition, and thus the operator can see all desirable data simultaneously and quickly. However, when this display is not to the operator's liking, the operator can change and specify a retrieval condition on the screen on which all the data are displayed simultaneously. Therefore, since it is not necessary to scroll from the page on which the data are displayed simultaneously back to the page of the retrieval menu, the troublesome process is not required, thereby performing the operation more quickly and improving convenience of use.

In addition, in the case where the retrieved results are displayed simultaneously, when a number of taken-out image data are large and all the data cannot be displayed simultaneously, it is possible to scroll the display to the next page or back to the previous page using the page scrolling function.

Further, in order that image data relating to a color which is not stored cannot be retrieved and specified, the button of this color is shaded off. For this reason, the operator can easily recognize it, and thus an unnecessary process does not have to be executed.

In addition, since the image data whose background is not colored, namely, image data of non-coloring, can be also retrieved and displayed in the color sequential retrieval, the image data without color can be seen without extra process. Needless to say, the color sequential retrieval may be set so that the image data without color are not retrieved, and in this case, since extra data other than necessary data are not displayed, the necessary data are easy to see.

Furthermore, in the case where a plurality of colors are retrieved in the retrieval according to colors, the image data relating to each color can be arranged on the display screen in arbitrary order by adjusting the order of specifying of a subject to be retrieved, thereby making it possible to see data from various viewpoints.

Here, the present invention is not limited to the above embodiment, so various application and modification can be considered.

(1) In the above arrangement, the order of display according to the color sequential retrieval is determined based on the contents stored in the color sequential area 121 (the order of priority that the operator previously set arbitrarily), but this order can be determined based on the order of colors such that a number of stored image data is larger. At this time, for an example of detecting the order of colors in which a number of stored image data is larger, the order can be detected based on a number of colors calculated at S48, S49 and S50 in FIG. 10, a number of addresses of colors stored in the address storage section 125, etc. Moreover, the positions where the red, green and blue buttons 201C through 201E are displayed on the screen where all the retrieval results are displayed, can also be arranged in the order of colors in which a number of stored image data is larger. As a result, the state of storing the image data can be easily recognized by the positions of the buttons 201C through 201E, and the image data whose number is the largest can be recognized first.

(2) In the above embodiment, dates at the time of input are stored in the input mode, and data are displayed on the display screen beginning from the one whose date is the latest in the retrieval mode. However, in another manner, instead of the dates, titles represented by characters can be stored in the input mode, and image data can be displayed on the display screen in the order of entry of characters in a dictionary, that is, for example, in the alphabetical order if the language is English in the retrieval mode.

(3) In the above embodiment, the date sequential button 201B, and the red, green and blue buttons 201C through 201E are listed on the screen, and they are normally displayed and inverted to be displayed. Thus, a retrieval condition and a selection menu for specifying a retrieval condition in claims are displayed simultaneously. However, the retrieval condition and the selection menu for specifying the retrieval condition may be displayed separately. Moreover, instead of the shaded-off display of a button which cannot be selected, display of a button which cannot be selected may be prohibited.

(4) In the above embodiment, the retrieval is executed based upon a background color of the image data itself, but in the case where a color is added to the image data, the retrieval can be executed based upon the color of the image data.

As mentioned above, the data processing apparatus of the present invention, which executes a retrieval process for retrieving data stored in a storage section according to a desired retrieval condition so as to display the retrieved data on a display section, is characterized in that when the retrieved data are displayed on the display section, the retrieved data and a retrieval condition relating to the retrieved data are displayed.

In accordance with the above arrangement, since the retrieved results according to a desired retrieval condition and the retrieval condition are displayed simultaneously, the retrieval condition can be exactly recognized at a glance on the display screen. As a result, it is not necessary to call another display image so as to confirm unlike the conventional method, thereby improving convenience of use.

In addition, in the present invention, since the retrieved results according to a desired retrieval condition, and a retrieval condition specifying section for changing the retrieval condition to another one are displayed simultaneously, when intending to change a retrieval condition, it is not necessary to call another display image so as to change and specify a retrieval condition unlike the conventional method. As a result, a retrieval condition can be changed simply and quickly on the screen where the retrieved results are displayed, thereby improving convenience of use.

Furthermore, in the present embodiment, when the retrieval condition specifying section for changing a retrieval condition is displayed, the display states (shaded-off display, etc.) differ from each other depending on as to whether or not the retrieval can be executed according to the retrieval condition shown by the specifying section. Thus, a retrieval condition which can be specified, can be distinguished from a retrieval condition which cannot be specified on the display screen at a glance. As a result, it is not necessary to execute useless processes, thereby improving convenience of use.

It is preferable that when the retrieved data are displayed on the display section, the retrieved data, the retrieval condition relating to the retrieved data, and a retrieval condition specifying section for changing a current retrieval condition to another one are displayed simultaneously. Further, when a position, where a desired retrieval condition specifying section is displayed, is touched, the retrieval process is executed according to a retrieval condition which is specified by the retrieval condition specifying section.

It is preferable that the data processing apparatus includes: a storage section for storing data; a display section for displaying various data; first display means for displaying a retrieval condition specifying section for retrieving desired data from the storage section on the display section; recognizing means for when a position where a desired retrieval condition specifying section is displayed is touched, recognizing the retrieval condition which is specified by the retrieval condition specifying section on the touched position; retrieval means for retrieving necessary data from the storage section according to the retrieval condition recognized by the recognizing means; and second display means for displaying the data retrieved by the retrieving means and the current retrieval condition simultaneously on the display section.

It is preferable that the data processing apparatus includes display managing means for when retrieved data and a current retrieval condition are displayed by the second display means, controlling the first display means so that display on each retrieval condition specifying section is continued.

It is preferable that a plurality of data as well as additional data representing an input sequence of the plurality of the data are stored into the storage means, and the first display means displays an input sequential retrieval specifying section for simultaneously displaying all the data in the storage section in the order of the input, and another retrieval condition specifying section on the display section as the retrieval condition specifying section.

It is preferable that a plurality of data as well as additional data representing background colors of the plurality of data are stored into the storage means, and the first display means displays a color sequential retrieval specifying section, for simultaneously displaying all data in each group into which all the data in the storage section are classified by their background colors in a desired order per group, and a retrieval specifying section according to colors, for simultaneously displaying data in a group for a specific background color, on the display section as the retrieval condition specifying section.

It is preferable that a plurality of data representing characters and graphics, additional data representing background colors of the plurality of data, and additional data representing an input sequence of the plurality of data are stored into the storage means, and the first display means displays (1) an input sequential retrieval specifying section, for simultaneously displaying all the data in the storage section in an order of the input, (2) a color sequential retrieval specifying section, for simultaneously displaying data in each group into which all the data in the storage section are classified by their background colors in a desired order per group, and (3) a retrieval specifying section according to colors for simultaneously displaying data in a group for a specified background color, on the display section as the retrieval condition specifying section.

In addition, a data processing apparatus of the present invention includes: a storage section for storing data representing characters and graphics, additional data representing background colors of the data, and additional data representing the order of input of the data correspondingly; a display section for displaying various data; first display means for displaying (1) an input sequential retrieval specifying section, for simultaneously displaying all the data in the storage section in the order of input, (2) a color sequential retrieval specifying section, for simultaneously displaying data in each group into which all the data in the storage section are classified by their background colors in a desired order per group, and (3) a retrieval specifying section according to colors, for simultaneously displaying data in a group for a specific background color, on the display section; recognizing means for when a position, where a desired retrieval condition specifying section is displayed, is touched, recognizing the retrieval condition represented on the retrieval condition specifying section in the touched position; retrieval means for retrieving necessary data on the storage section according to the retrieval condition recognized by the recognizing means; second display means for displaying the data retrieved by the retrieval means on the display section; and display managing means for when the retrieved data are displayed by the second display means, inverting and displaying the retrieval condition specifying section showing a current retrieval condition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data processing apparatus, which executes a retrieval process for retrieving stored data according to a desired retrieval condition so as to display the retrieved data, comprising:

retrieval means for retrieving stored data;

a storage section which stores the data and additional data representing background colors used in classifying the data; and a display section which displays a plurality of color specifying sections, one for each of the background colors, each color specifying section, when selected, specifying its corresponding color as a retrieval condition, wherein when all of said color specifying sections are selected, said retrieval means performs color sequential retrieval, retrieving from said storage section all of the data of each background color in a predetermined color order, and if there is a background color for which no corresponding data is stored in said storage section, said display section displays that no data is stored for that color by changing form of the display of the color specifying section corresponding to that background color, and wherein when less than all of said color specifying sections are selected, said retrieval means performs retrieval according to colors, retrieving data from said storage section having the background color of each selected color specifying section, and said display section displays each selected color by changing form of the display of each color specifying section corresponding to a selected color.

2. The data processing apparatus according to claim 1, wherein;

when the retrieved data are displayed on the display section, the retrieved data, the retrieval condition relating to the retrieved data, and a retrieval condition specifying section for changing a current retrieval condition to another one are displayed simultaneously, and when a position, where a desired retrieval condition specifying section is displayed, is touched, the retrieval process is executed according to a retrieval condition specified by the retrieval condition specifying section.

3. The data processing apparatus according to claim 2, further comprising display managing means for, when a retrieved data and a current retrieval condition are displayed, controlling said display section to continue display of each retrieval condition specifying section.

4. The data processing apparatus according to claim 2, wherein;

a plurality of data as well as additional data representing an input sequence of said plurality of the data are stored into said storage section, and said display section displays an input sequential retrieval specifying section for simultaneously displaying all the data in said storage section in order of input, and another retrieval condition specifying section on said display section as the retrieval condition specifying section.

5. The data processing apparatus according to claim 4, further comprising display managing means for, when retrieved data and a current retrieval condition are displayed, controlling said display section to continue display of each retrieval condition specifying section.

6. The data processing apparatus according to claim 2, wherein;

a plurality of graphical data, additional data representing background color of said plurality of graphical data, and additional data representing an input sequence of said plurality of graphical data are stored into said storage section, and said display section displays (1) an input sequential retrieval specifying section for simultaneously displaying all the data in said storage section in an order of input, (2) a color sequential retrieval specifying section for simultaneously displaying data in each group into which all the data in said storage section are classified by background color in a desired order per group, and (3) a retrieval specifying section according to colors for simultaneously displaying data in a group for a specified background color, on said display section as the retrieval condition specifying section.

7. The data processing apparatus according to claim 6, further comprising display managing means for, when retrieved data and a current retrieval condition are displayed, controlling said display section to continue display of each retrieval condition specifying section.

8. The data processing apparatus according to claim 6, wherein said display section inverts the retrieval condition specifying section representing a current retrieval condition so as to display the current retrieval condition.

9. The data processing apparatus according to claim 8, further comprising display managing means for, when retrieved data and a current retrieval condition are displayed, controlling said display section to continue display of each retrieval condition specifying section.

10. The data processing apparatus according to claim 2, wherein;

a plurality of data as well as additional data representing titles of said plurality of data are stored into said storage section, and said display section displays a character sequential retrieval specifying section for simultaneously displaying all the data in said storage section in an order of entry in a dictionary, on said display section, as the retrieval condition specifying section.

11. The data processing apparatus according to claim 1, wherein a color specifying section corresponding to a background color for which no data is stored, is shaded off.

12. The data processing apparatus according to claim 1, wherein a color specifying section corresponding to a background color for which no data is stored, is not displayed.

13. The data processing apparatus set forth in claim 1, wherein:

said display section displays current retrieval conditions by inverted display of each color specifying section corresponding to a background color of current retrieved data.

* * * * *